United States Patent [19]
Kaiser et al.

[11] Patent Number: 4,715,223
[45] Date of Patent: Dec. 29, 1987

[54] DEVICE FOR TESTING PROPERTIES OF COINS

[75] Inventors: Bernhard Kaiser; Ortwin Wokoeck, both of Villingen-Schwenningen, Fed. Rep. of Germany

[73] Assignee: Kienzle Apparate GmbH, Villingen-Schwenningen, Fed. Rep. of Germany

[21] Appl. No.: 716,033

[22] Filed: Mar. 26, 1985

[30] Foreign Application Priority Data

Mar. 28, 1984 [DE] Fed. Rep. of Germany ....... 3411347

[51] Int. Cl.[4] ............................................ G01D 5/00
[52] U.S. Cl. ...................................... 73/163; 194/334
[58] Field of Search .................. 73/163; 194/227, 334

[56] References Cited

U.S. PATENT DOCUMENTS

| | | | |
|---|---|---|---|
| 1,910,963 | 5/1933 | Polsen et al. | 73/163 X |
| 3,653,481 | 4/1972 | Boxall et al. | 73/163 X |
| 3,997,507 | 8/1976 | Kaiser | 194/334 X |

FOREIGN PATENT DOCUMENTS

| | | | |
|---|---|---|---|
| 0243692 | 6/1960 | Australia | 73/163 |
| 1474805 | 3/1969 | Fed. Rep. of Germany | 194/227 |
| 2243221 | 3/1974 | Fed. Rep. of Germany . | |
| 2445204 | 3/1976 | Fed. Rep. of Germany . | |
| 1266743 | 3/1972 | United Kingdom | 73/163 |

*Primary Examiner*—Daniel M. Yasich
*Attorney, Agent, or Firm*—Toren, McGeady & Associates

[57] ABSTRACT

A device for testing the magnetic properties of coins in coin operated apparatus such as parking meters, used in conjunction with a coin diameter testing device. The device includes a double arm rocker lever provided on a side wall of a coin guiding duct. A first arm of the rocker lever is equipped with a permanent magnet and the latter extends through an opening of the side wall into the range of a coin which has been inserted into the coin guiding duct and which temporarily rests on a coin support. A second arm of the rocker lever includes a locking bracket which can be controlled so as to be in and out of engagement with a testing segment required for the test for determining the diameter of coins.

7 Claims, 4 Drawing Figures

DEVICE FOR TESTING PROPERTIES OF COINS

BACKGROUND OF THE INVENTION

The present invention relates generally to a device for testing magnetic properties of coins in coin-operated apparatus, particularly for setting and displaying the parking time in a parking meter. The device is used in conjunction with a coin diameter testing device for testing the diameter of a coin which temporarily rests on a coin support of the device.

Experience has shown that in coin-operated apparatus, such as parking meters, it is no longer sufficient to restrict the test of a coin to the test of its diameter in order to determine the genuineness of the coin. In coin-operated apparatus, such as parking meters, it is frequently attempted to operate the apparatus in an unauthorized manner by inserting objects resembling coins, such as disks, plastic chips or the like. This unauthorized use is possible when the diameter of a counterfeit coin corresponds with sufficient accuracy to the dimensions of a genuine coin and if, moreover, no other properties in addition to the diameter of the coin are tested.

An effective test of the genuineness of a coin becomes difficult when the counterfeit coins are so-called gambling money of plastics material whose outer dimensions and in both surfaces are fashioned exactly as the metal coins which are circulating as genuine legal tender. To be able to distinguish such plastic coins from genuine metals coins of the same type, it is possible to utilize the behavior of iron-containing metal coins with respect to the force of a magnetic field.

Another possibility would be to classify the coins with respect to their differing weights and to guide them into appropriate coin ducts. In accordance with this method, a sensitive coin scale is used and, in addition, a long coin conveying path is required, into which path the coin scale is indicated and in which acceptable and unacceptable coins are conducted through two separate ducts.

The utilization of coin scales in parking meters has not proved defective because of the hostile environmental conditions to which parking meters are subjected. It has been found that a solution by weighing does not ensure a satisfactory operation. The influences to which a coin scale in a parking meter are subjected can be explained by the location of parking meters. As a rule, parking meters are located at the curb of a road or other outdoor site where extreme conditions such as cold temperatures, moisture, and dirt have detrimental effects on the sensitive components of a coin scale.

In view of the above, coin testing devices have become known which classify the coins to be tested on the basis of a magnetic field interacting with the iron content of the coin material, which then divert them into transport ducts or generally refuse acceptance or the like.

German Utility Model No. 17 45 460 describes a simple magnetic coin test wherein a magnet is provided in a coin duct which magnet diverts a coin into a specific direction due to the influence of a field of magnetic force. In accordance with the utility model, a permanent magnet in the shape of a circular disk is magnetized in such a way that the lines of magnetic force extend externally approximately around each half of the disk. A coin which can be magnetically influenced falls due to its own weight through the zone of field lines of the magnetic disk and rolls with its outer surface on the magnetic disk as a result of the attraction forces acting on it. A genuine coin is deflected into a coin duct which, in conjunction with a diameter test, serves to trigger the operation of the parking meter. A coin which cannot be influenced magnetically, on the other hand, falls through vertically without any deflection by the magnetic disk into a collecting container.

The efficiency of the magnetic field through the opposing circular arc-shaped surfaces upon the coin is very poor because the two surfaces theoretically contact one another only along the short line corresponding to the thickness of the coin. Moreover, this device operates only in one mode of operation, that is, only coins containing iron are accepted as genuine coins because only ferromagnetic coins can reach the coin duct for utilizable coins. All coins of non-ferrous material or plastic chips fall through vertically, past the diameter testing station, into a special duct and a collecting container. This also means that two separate coin conveying ducts corresponding to genuine and counterfeit coins must be provided.

German Offenlegungsschrift No. 22 43 221 disclosed another magnetic coin testing apparatus, wherein a rotatably mounted locking bolt blocks in its position of rest with its one end a sensor pin at a double lever for sensing the diameter and releasing the time, and extends with its other end which carries a magnet into the coin conveying path. The magnet test lever interacts in principle directly with a pivotable diameter sensing member by means of a swing arm, so that a diameter sensing element or sensor pin and, thus, the double lever, is held in a locking position. The magnetic arm of the locking lever precedes the diameter test and extends into the coin insertion duct. Only if a ferromagnetic coin is inserted is the locking lever arm moved during the transport of the coin due to the attraction forces between the coin and the magnetic locking lever arm, and the latter, as the effective sensing member, releases the sensor pin for the diameter test. The diameter testing member is part of a double lever which, in turn, locks or releases the sensing member for setting a time control device. If a time setting is to be triggered, the double lever must be released before any diameter test is performed. This release can only occur by means of an object containing iron.

The transport of the locking lever effected solely by the field of magnetic force does not ensure an absolutely safe operation. The conditions of friction between the locking lever and the double lever lead to many operational uncertainties. The elimination of a ferromagnetic coin from non-ferrous coins can be accomplished with this apparatus because the double lever can be controlled by the locking lever for releasing the time setting only by means of coins of ferromagnetic materials.

In accordance with the coin testing device known from the German Pat. No. 24 45 204, a testing zone whose cross-sectional area is expanded is provided in the coin conveying duct. Two magnets are arranged on the same level at a fixed coin duct wall which attract those passing coins which can be magnetically influenced. A spring-loaded sensor lever which extends into the testing zone is deflected into a position releasing the time setting means of a lateral movement of the coin.

The testing device discussed above is only capable of recognize ferromagnetic coins as acceptable, because only these coins actuate a time release. The reverse case, i.e., the recognition in the testing zone of non-ferrous coins as acceptable, cannot be achieved with this known solution. A further disadvantage resides in the fact that the coin which is attracted through magnetic force across an air gap, must overcome the spring force of the sensor lever and additional frictional resistance in order to achieve a time release.

Finally, German Offenlegungsschrift No. 29 49 658 describes a coin testing device for parking meters with a coin conveying system. In this device, the cross-sectional area of the coin conveying duct is expanded as compared to the thickness of an acceptable coin. Also, stationary magnets are provided in a side wall which magnets cause a lateral shift of the passing ferromagnetic coin. In order to distinguish between coins of equal diameter, coin support paths are provided in the region of the testing zone, which paths are offset laterally and arranged at different levels with respect to the support base. A coin which can be influenced by a magnet is laterally deflected by the force of the magnet and reaches the corresponding coin support base which differs in level from the coin support base for coins containing no iron. With respect to coins having equal diameters, the deflection to the different support bases in the testing zone simulates the presence of coins having different diameters in order to enable a selection. This device is actually only suitable for differentiating between coins which have equal diameters, but which are of magnetically different materials. In addition, the coins are conducted by means of a conveying system positively through the testing zone.

It is the object of the present invention to provide a simple device for testing the magnetic properties of coins which have been inserted into a coin testing unit of a coin-operated apparatus and for further triggering the acceptance of usable coins or the collection of counterfeit coins.

SUMMARY OF THE INVENTION

In accordance with the present invention, a double arm rocker lever is provided on a side wall of a coin guiding duct. A first arm of the rocker lever is equipped with a permanent magnet and the latter extends through an opening of the side wall into the range of a coin which has been inserted into the coin guiding duct and which temporarily rests on a coin support. A second arm of the rocker lever includes a laterally extending locking bracket which can be controlled so as to be in and out of engagement with a testing segment required for the test for determining the diameter of coins.

The rocker lever according to the invention can assume two positions of operation. The rocker lever has a permanent magnet which provides an effective magnetic field. The pivoting axis of the double arm rocker lever is formed by cantilevered lugs. The rocker lever further has a locking bracket which extends directly into the path of movement of a test segment which, as a diameter scanning element, is brought into motion only after a coin has been inserted and a rotary knob of the parking meter has been actuated. In the described system, the coin falls after insertion onto a coin support in the testing region and remains there motionless in a defined position on prismatically shaped supports.

A permanent magnet arranged on the rocker lever in the area of the coin to be tested reacts directly on the basis of the properties of the coin material, i.e., the magnet is attracted to the coin if the coin contains iron or the magnet remains in its initial position if the coin is not susceptible to magnetism. Based on this decision, the locking bracket of the rocker lever can be made to interact with the test segment in such a way that the segment does or does not perform the diameter test.

It is of fundamental significance in this connection that the operation of the rocker lever in its interaction with the test segment can be selected in such a way that, according to the nature of the coin material approved for a particular device, coins consisting of an unapproved material are eliminated. In other words, if coins containing iron are approved for evaluation, all coins not susceptible to magnetism are eliminated. Conversely, every object containing iron can be eliminated at the outset before any diameter test is performed, if coins not susceptible to magnetism, for instance, plastic disks, are intended to be evaluated in the device. A reliable decision is assured in a simple manner thereby that the permanent magnet responds to the material to be tested and the locking bracket is moved from the locking position into the release position, or the locking bracket is moved from the release position into the locking position. The testing operations cannot overlap because the diameter test is conducted at a much later time when the rotary knob of the meter is actuated.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
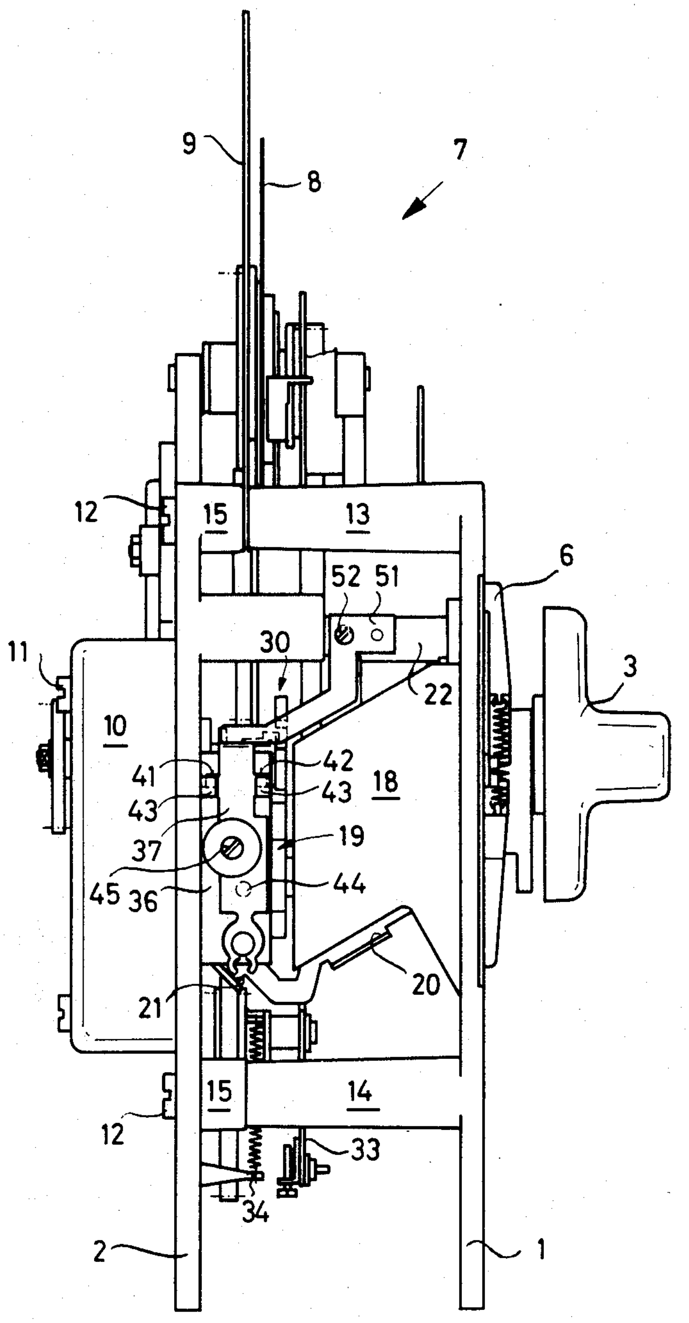
FIG. 1 is a side elevational view of a parking meter, showing the coin guiding duct and the rocker lever.
Figure 1:
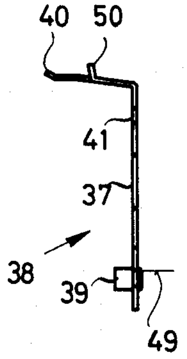

In FIG. 1, a side elevational view of a parking meter device is shown with the housing of the parking meter removed. As illustrated, all components for accepting and evaluating coins and for setting an appropriate parking time are mounted between a front plate 1 and a rear plate 2. Front plate 1 is on the side facing the user. A rotary knob 3 is arranged on the front side, knob 3 being mounted on a shaft 4 which is rotatably supported in front plate 1. Rotary knob 3 is fixedly attached to shaft 4. Rotary knob 3 serves for the manual actuation of the parking meter to set to an allowable parking time, after the acceptable coin 5 has been inserted. Also attached to front plate 1 is a lockable coin insertion device 6 forming a compact structural unit. Coin insertion device 6 serves for the insertion of coins 5 of all diameters currently in use, but which prevents the insertion of other unsuitable objects which would block the clock mechanism or render it incapable to operate.

Depending on the insertion of a usable coin 5, a time indicating mechanism 7 can be set which indicates the allowable parking time on a time scale 9 by turning a rotatable time-indicating disk 8. On tear plate 2 is attached with two screws 11 a time mechanism 10 forming a separate structural unit which can be replaced easily. Front plate 1 and rear plate 2 are assembled by means of three self-tapping screws 12 extending through spacers 13, 14 and 15, 16 which are cast onto plates 1 and 2. Time scale 9 is slid between spacer posts 13 and 14 prior to the tightening of the two upper screws 12.

For guiding a coin 5 into the test zone of a coin testing device 17, behind coin insertion device 6 there is provided a coin guiding duct 18 which extends obliquely toward the bottom and is manufactured structurally in one piece with front plate 1. Coin insertion device 6 is in geared connection with a locking segment 26 which is rotatably mounted on front plate 1 and is in a positive drive connection with rotary knob 3. Coin insertion device 6 is unlocked exclusively in the normal position of rotary knob 3, so that a coin 5 can be inserted into the apparatus only when the rotary knob 3 is in this initial position. Coin guide channel 18 leads into a coin guiding chute 19 having the same cross-sectional area and which is manufactured in one piece with rear plate 2. Coin guiding duct 18 and coin guiding chute 19 form the coin testing zone in which a coin 5 is initially supported on a prismatic shaped support 20, 21 for purposes of testing coins for diameter.

Figure 2:
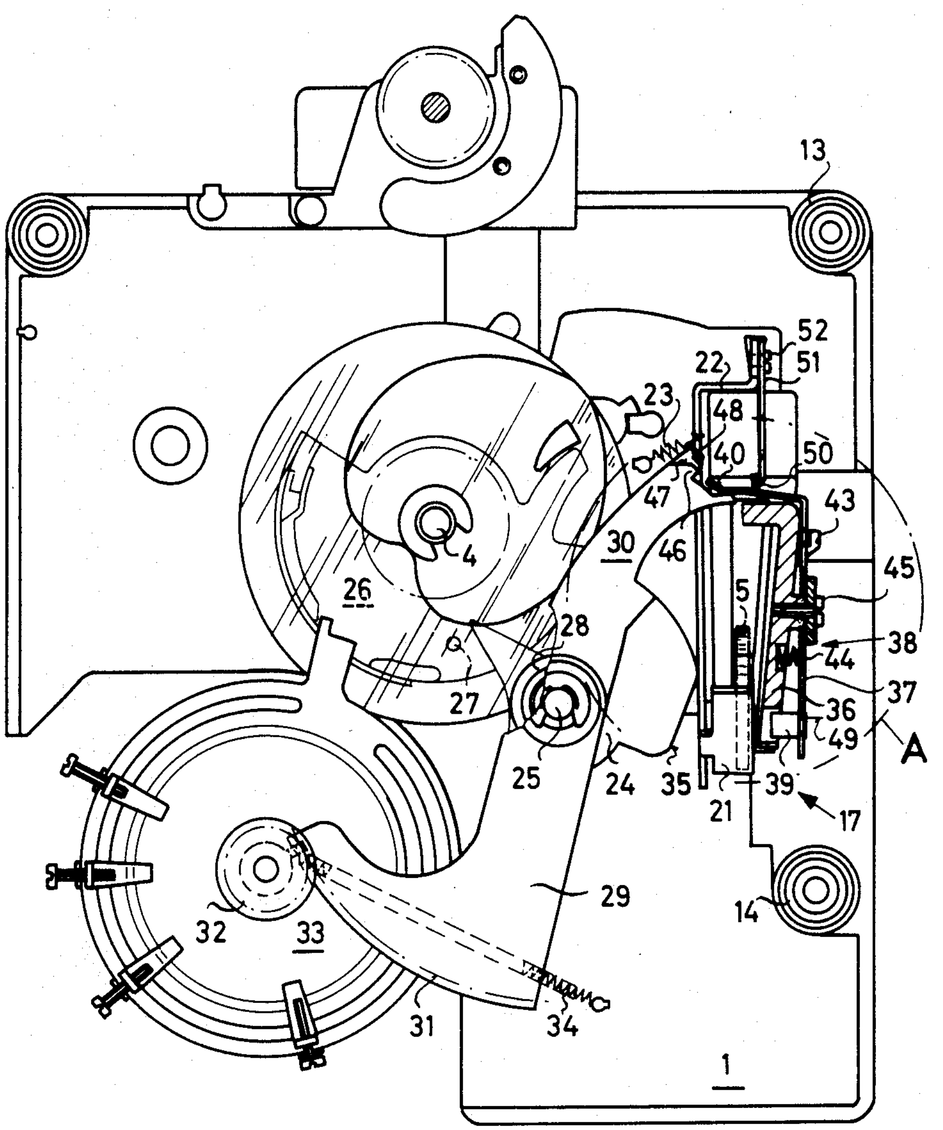
FIG. 2 is a partial front elevational sectional view of the coin guiding duct, showing the rocker lever in interaction with a coin testing segment.
Figure 3:
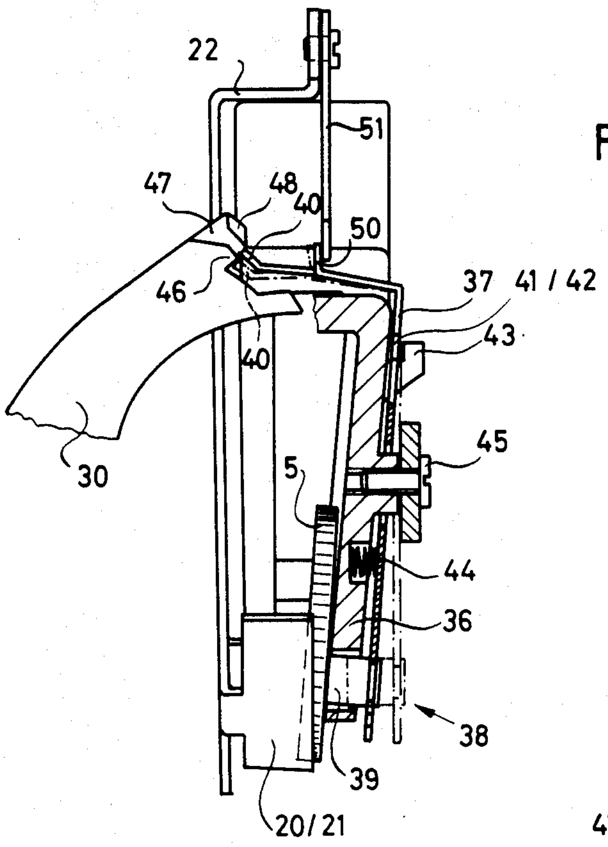
FIG. 3 is an enlarged view of detail A of FIG. 2 showing the engagement of the rocker lever with the coin testing segment in the two positions of operation before and after insertion of a coin, when the device is used for accepting coins which are susceptible to magnetism and for rejecting non-magnetic coins.
Figure 4:
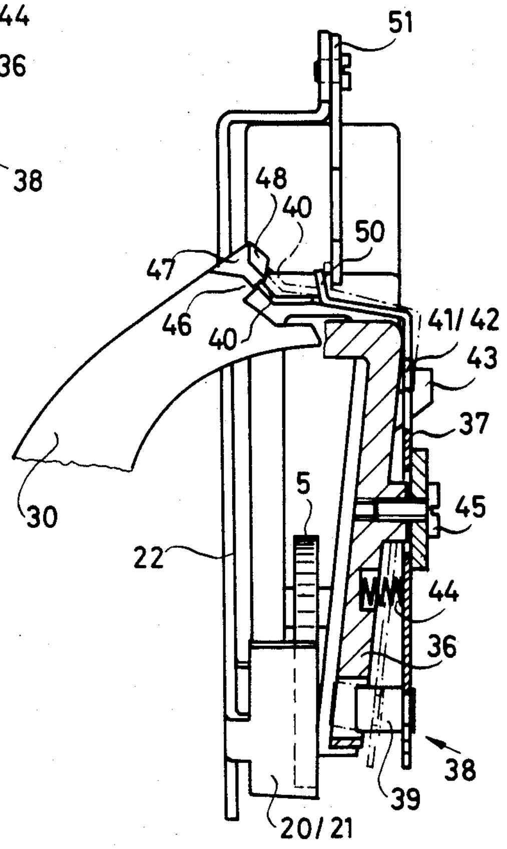
FIG. 4 is a view of the same detail as shown in FIG. 3, however, showing the situation wherein a non-magnetic coin is acceptable and coins susceptible to magnetism are rejected.

Supports 20 and 21 are arranged at a certain angle with respect to one another and are part of a pivotable coin lock 22 which is mounted between front plate 1 and rear plate 2. Coin lock 22 assumes two positions of operation. In the initial position, coin lock 22 is pivoted backwardly against the action of a tension spring 33 in such a way that supports 20 and 21 close off coin guide channel 18 which is open towards the bottom, as well as coin guiding chute 19. Due to the prismatically shaped arrangement of supports 20 and 21, a coin 5 resting thereon assumes a defined position. In order to release a coin 5 after the test for diameter has been concluded, coin lock 22 has to be pivoted away and coin 5 can fall toward the bottom and into a collection container, not shown. For this purpose, coin lock 22 is in geared connection with a control disk 24 on a shaft 25 of coin testing device 17. Control disk 24 is moved by a drive member 27 on locking segment 26 which, as illustrated in FIG. 2, is driven in a counterclockwise direction when rotary knob 3 is actuated. At the same time, control disk 24 drives a torsion spring-loaded coupling sleeve 28 which is rotatably mounted on shaft 25 and, through coupling sleeve 28, a test segment 29 which is also arranged coaxially rotatably on the shaft 25. Test segment 29 is a double lever, one arm of which carries a sensing member 30 and a second arm of which is provided with a toothed segment 31.

As illustrated in FIG. 2, test segment 29 is pivoted in a clockwise direction from its initial position when rotary knob 3 is turned. Sensing member 30 thus comes into contact with the periphery of a coin 5 which rests on the prismatically shaped supports 20,21 of coin lock 22. The excess distance to be travelled by control disk 24 is absorbed by torsion spring-loaded coupling sleeve 28. The position of sensing member 30 in contact with the periphery of a coin 5 is transmitted for evaluation through toothed segment 31 to a gear 32 on a testing disk 33. The testing disk 33 is thereby moved against the force of the return spring 34 into a defined lockable position.

During the testing of the coin, that is, up to and including the time the testing disk 33 is moved into a lockable position, coin 5 remains in the test position on supports 20, 21 of coin lock 22. That is ensured by means of control disk 24 which includes a peripheral cam 35 which presses against coin lock 22 until the testing procedure is concluded. Subsequently, control disk 24 is driven in the opposite direction and releases coin lock 22 as a result of the descending portion of cam 35. Due to the action of tension spring 23, coin lock 22 pivots and releases coin 5 which falls downwardly.

In order to carry out a further distinction between genuine and counterfeit coins, it is possible to test the magnetic properties of the coin material. This type of test is absolutely required if, for example, gambling money in the form of dimensionally accurately reproduced plastic coins is in circulation. A distinction can then only be made by means of specifying the material. A test utilizing a field of magnetic force is particularly useful for this purpose. Since most coins are of a material which contains iron, the coins react to the action of a magnetic field. To effect an elimination of coins on a basis completely independent from other test criteria, such as, diameter or thickness, the test for ferromagnetic properties of a coin 5 and the resulting control procedure are incorporated into the coin testing process as the first testing phase. This means that a separation takes place already at that time when the material properties are found to be not suitable.

The suitable time for testing the coin with respect to its ferromagnetic properties is that moment when coin 5 after having been inserted arrives on supports 20, 21 and is resting temporarily stationary in coin guiding chute 19 held by coin lock 22.

Carrying out the test for magnetic properties of coins, a member 38 comprising a double arm rocker lever 37 is provided on a side wall 36 of coin guiding chute 19. One arm of rocker lever 37 is provided with a permanent magnet 39 which extends into the region of a coin 5 which has been introduced into the coin guiding chute 19 and rests on coin supports 20, 21. The other arm of rocker lever 37 has a laterally extending locking bracket 40 which can be moved so as to be in or out of engagement with a testing segment 29 which is used for diameter testing. For performing a pivoting motion, rocker lever 37 is equipped with lugs 41, 42 attached on both sides. Lugs 41, 42 are used to place rocker lever 37 into hook-shaped support stirrups 43 on side wall 36 of coin guiding chute 19.

Rocker lever 37 can be moved into two defined positions of operation. The initial position of operation is obtained by providing a compression spring 44 between rocker lever 37 and side wall 36 of coin guiding chute 19 and an adjustable set screw 45. The end position of operation of rocker lever 37 is reached when it rests on side wall 36 due to the attraction forces of permanent magnet 39 when a ferromagnetic coin 5 is placed on coin supports 20, 21. The initial position of operation of rocker lever 27 can be adjusted by means of set screw 45 in such a way that locking bracket 40 is always positioned in front of locking projection 46 at test segment 29 and thus blocks the pivoting motion of test segment 29, and the release of test segment 29 is caused thereby that member 38 is attracted by a ferromagnetic coin 5 and locking bracket 40 is moved out of its locking position. The situation discussed above, according to which locking bracket 40 is moved from a locking position into a release position for the testing segment 29, is applicable when coins 5 to be accepted for evaluation consist of a material which is susceptible to magnetism.

However, the reverse case also exists, wherein the coins 5 which are susceptible to magnetism are to be eliminated and all other coins 5 or chips of non-ferrous material or plastics material are to be considered acceptable. In this case, the initial position of operation of rocker lever 37 can be adjusted by means of set screw 45 in such a way that locking bracket 40 can always extend into a gate-like recess 47 of test segment 29 and releases this segment for a pivoting motion to carry out the diameter test, but if a ferromagnetic coin 5 is inserted, the release position is cancelled and the locking bracket 40 is moved into the effective range of another locking projection 48 at test segment 29. In the case mentioned last, test segment 29 cannot come into contact with coin 5, the diameter test is not performed and no time setting of the parking meter can take place.

A bore 49 open to one side is provided in rocker lever 37 for receiving permanent magnet 39 resulting in a clamping action which makes adjustable the extent to which the cylindrical permanent magnet 39 extends into the range of coin 5, so that a certain air gap for positioning coin 5 can be adjusted. The air gap is required so that, after the test has been performed, a coin 5 which is susceptible to magnetism can, after its release, freely fall through coin lock 22 and is not held by the field of magnetic forces and the embossed surface of a coin does not get caught at the end face of the permanent magnet 39.

Finally, rocker lever 37 has a control finger 50 which interacts with a bracket 51 of pivotable coin lock 22 in such a way that, when the coin lock 22 is pivoted, rocker lever 37 simultaneously is moved into the initial position of operation in which coin 5 can fall into a collection container unimpeded by the magnetic field. The positive control of rocker lever 37 into the initial position interrupts the action of the magnetic field, and the large air gap ensures that the coin does not get caught. Bracket 51 is screwed onto coin lock 22 by means of screw 52.

While a specific embodiment of the invention has been shown and described in detail to illustrate the application of the inventive principles, it will be understood that the invention may be embodied otherwise without departing from such principles.

We claim:

1. Device for testing for magnetism and diameter coins in coin operated apparatus such as parking meters, comprising an upwardly extending coin guiding duct having an upwardly extending side wall and a lower end, a coin support means provided at said lower end of said coin guiding duct, a rocker lever having first and second arms, an adjustable set screw attaching said rocker lever to said side wall, a testing segment for carrying out a coin diameter testing step when a coin rests on said coin support means, a permanent magnet mounted on said first arm of said rocker lever, said magnet extending to the range of a coin resting on said support means, so that the magnet is attracted by the coin if the coin is ferromagnetic, whereby said first arm of said rocker is moved toward the coin, said second arm comprising a locking bracket capable of engaging or being disengaged from said testing segment, depending on whether said first arm is moved toward the coin.

2. Device according to claim 1, wherein said side wall of said coin guiding duct includes hook-shaped support stirrups, and said rocker lever has two lugs received in said support stirrups.

3. Device accordng to claims 1 or 2, wherein said rocker lever is movable to first and second positions of operation in dependence upon the adjustment of said set screw, wherein said first position is the initial position and said second position is the final position, a compression spring provided between said rocker lever and said side wall of said coin guiding duct, said spring biasing said rocker lever into said first position, wherein said rocker lever assumes said second position when moved by attraction forces generated by said permanent magnet when a ferromagnetic coin rests on said coin support.

4. Device according to claim 3, wherein said testing segment includes a locking projection, and said first position of said rocker lever is adjustable by means of said set screw so that said locking bracket is positioned in front of said locking projection and the movement of said testing segment is blocked, and wherein said testing segment is released when said permanent magnet is attracted by a ferromagnetic coin and said locking bracket is moved from its blocking position.

5. Device according to claim 3, wherein said testing segment defines a recess and said rocker lever is adjustable by means of said set screw so that said locking bracket engages in said recess of said testing segment, and wherein said testing segment includes another locking projection, and said rocker lever is moved out of engagement with said recess of said testing segment and into contact with said another locking projection when said permanent magnet is attracted by a ferromagnetic coin.

6. Device according to claims 1 or 2, wherein said rocker lever defines a bore open to the side facing said coin support means, said bore receiving said permanent magnet resulting in a clamping action, so that the distance between said coin and said permanent magnet is adjustable and an adjustable air gap remains between said coin and said permanent magnet.

7. Device according to claims 1 or 2, wherein said rocker lever comprises a control finger and said coin guiding duct comprises a pivotable coin lock with a bracket, wherein said control finger and said bracket interact so that when said coin lock is pivoted, said rocker lever is moved into said first position in which said coin can drop downwardly unimpeded by said magnet into a collection container.

* * * * *